United States Patent [19]

Shiota

[11] Patent Number: 4,563,083

[45] Date of Patent: Jan. 7, 1986

[54] PHOTOGRAPHIC PRINTING APPARATUS

[75] Inventor: Kazuo Shiota, Kanagawa, Japan

[73] Assignee: Fuji Photo Film Co., Ltd., Tokyo, Japan

[21] Appl. No.: 594,243

[22] Filed: Mar. 28, 1984

[30] Foreign Application Priority Data

Apr. 11, 1983 [JP] Japan .................................. 58-63287

[51] Int. Cl.$^4$ ............................................ G03B 27/80
[52] U.S. Cl. ........................................ 355/38; 355/77
[58] Field of Search ...................... 355/38, 41, 68, 77, 355/14 E, 35, 32, 83

[56] References Cited

U.S. PATENT DOCUMENTS 4,264,194 4/1981 Pone et al. ..................... 355/68 X
4,293,215 10/1981 Rosborough, Jr. et al. ......... 355/77
4,353,641 10/1982 Merlo .............................. 355/68 X Primary Examiner—L. T. Hix
Assistant Examiner—Della Rutledge
Attorney, Agent, or Firm—Pasquale A. Razzano

[57] ABSTRACT

A photographic printing apparatus comprises a system for discriminating exposure information on a first print and memorizing exposure conditions of the first print corresponding to the exposure information, and a control keyboard for inputting an exposure correction amount of a second print with respect to the first print. Exposure conditions of the second print are determined by combining the exposure conditions of the first print with the exposure correction amount of the second print with respect to the first print. When the second print is produced by a second apparatus different from a first apparatus used for producing the first print, a system for inputting and memorizing a difference in setting conditions between the first and second apparatuses is also provided to determine the exposure conditions of the second print on the basis of the exposure conditions of the first print, the exposure correction amount, and the difference in setting conditions between the first and second apparatuses.

7 Claims, 2 Drawing Figures

PHOTOGRAPHIC PRINTING APPARATUS

BACKGROUND OF THE INVENTION

1. Field of the Invention

This invention relates to a photographic printing apparatus provided with a make-over printing function. This invention particularly relates to a photographic printing apparatus for color photographs provided with a make-over printing function.

2. Description of the Prior Art

As color photographic printing systems, there have heretofore been known a simultaneous printing system and an extra printing system. In the simultaneous printing system, after development of exposed negative films, all originals recorded in the negative films are printed in photographic paper. On the other hand, in the extra printing system, among the originals developed in the negative films, only those specified by customers are printed in a desired number of photographic paper sheets.

In the simultaneous printing system, many developed negative films are connected with each other to a continuous length, and marks corresponding to information comprehended in the originals in respective negative films are put in the respective negative films. Then, printing is conducted quickly and continuously in a manner suitable for the originals developed in the negative films. For example, the aforesaid continuous length is constituted by 12-frame or 24-frame rolls of films in a number within the range of about 100 pieces to about 200 pieces.

When the simultaneous printing process is conducted, the printing apparatus measures densities of three primary colors (red, green, and blue) included in the originals recorded in the negative films. Then the printing apparatus conducts calculations using information on correction according to the picture patterns of the color negatives and printing conditions in the printing apparatus, and determines exposure amounts of the photographic paper sheets with respect to cyan, magenta and yellow. Thus color ratios are corrected to obtain a desired color tone, and the originals are printed in photographic paper sheets.

However, in the aforesaid simultaneous printing process, defective prints exhibiting color tones different from those desired by the customers arise in a ratio generally within the range of several percent or less. Such defective prints are subjected to a make-over process which is called a remake printing and which is carried out on the basis of printing information recorded, for example, on the back side of each print at the time of simultaneous printing.

On the other hand, in the aforesaid extra printing system, most customers desire to obtain extra prints exhibiting approximately the same tones as those of prints previously produced by simultaneous printing and given by the customers to an extra printing operator. Thus the extra printing operator uses the prints given by the customers as sample prints, and visually recognizes the printing conditions recorded, for example, on the back sides of the sample prints. On the basis of the printing conditions thus recognized, the extra printing operator conducts printing.

As described above, in the conventional techniques, it is necessary for printing operators to visually recognize the printing information recorded, for example, on the back sides of defective prints arising during the simultaneous printing and the sample prints given by customers for extra printing, and to produce acceptable prints on the basis of the printing information thus recognized. Thus recognition of deviations from printing conditions for the three primary colors, i.e. red, green and blue, must depend on intuition of the printing operator. Therefore, printing accuracy and efficiency become very low.

Further, in the conventional make-over printing process, the first print and the second print are generally produced by use of different printers. When there is a difference in the printing setting conditions between the different printers, the difference in the printing setting conditions between the printers must also be taken into consideration when the make-over printing operator determines the correction amount of the exposure conditions. Thus the printing work becomes complicated, and there is the risk of a mistake arising in the printing work.

SUMMARY OF THE INVENTION

The primary object of the present invention is to provide a photographic printing apparatus provided with a make-over printing function which reduces manpower for make-over.

Another object of the present invention is to provide a photographic printing apparatus provided with a make-over printing function which realizes quick make-over processing at a high accuracy.

In one aspect of the present invention, there is provided a photographic printing apparatus for photometrically detecting the density information on three primary colors consisting of red, green and blue in an original recorded in a negative film, and for determining exposure conditions of said negative film by combining said density information with printing setting conditions in said photographic printing apparatus and an exposure correction amount according to a picture pattern, wherein the improvement comprises the provision of a means for discriminating exposure information on a first print and memorizing exposure conditions of said first print corresponding to said exposure information, and a control keyboard for inputting an exposure correction amount of a second print with respect to said first print, whereby exposure conditions of said second print are determined by combining said exposure conditions of said first print with said exposure correction amount of said second print with respect to said first print.

In another aspect of the present invention, there is provided a photographic printing apparatus for photometrically detecting the density information on three primary colors consisting of red, green and blue in an original recorded in a negative film, and for determining exposure conditions of said negative film by combining said density information with printing setting conditions in said photographic printing apparatus and an exposure correction amount according to a picture pattern, wherein the improvement comprises, when a second print is provided by use of a second printing apparatus different from a first printing apparatus for producing a first print, providing a means for discriminating exposure information on said first print and memorizing exposure conditions of said first print corresponding to said exposure information, a control keyboard for inputting an exposure correction amount of said second print with respect to said first print, and a means for inputting and memorizing a difference in setting conditions between said first printing apparatus and said second printing apparatus, whereby exposure conditions of said second print are determined by combining said exposure conditions of said first print, said exposure correction amount of said second print with respect to said first print, and said difference in said setting conditions with one another.

In the first aspect of the present invention, printing information recorded or printed on the first print, i.e. a defective print arising during simultaneous printing or a sample print given by a customer for extra printing, is read out by use of a mark reading machine such as an optical character reader (OCR) or an optical mark reader (OMR). Then the exposure conditions of the second print, i.e. a remake print or an extra print, are determined by combining the exposure information on the first print thus obtained with the correction amount of the exposure conditions with respect to the first print, which is entered by the printing operator from the control keyboard for producing an optimal print. Accordingly, the photographic printing apparatus in accordance with the first aspect of the present invention realizes quick make-over printing at a high accuracy. This is very advantageous over the conventional photographic printing apparatus.

Further, in the second aspect of the present invention, the controller automatically adjusts the exposure conditions of the second print on the basis of the correction amount set in advance. That is, it is not necessary for the printing operator to consider a difference in the printing setting conditions between different printers. Accordingly, manpower for make-over printing is reduced, and accuracy of the make-over function is improved.

DESCRIPTION OF THE PREFERRED EMBODIMENTS

The present invention will hereinbelow be described in further detail with reference to the accompanying drawings.

Figure 1:
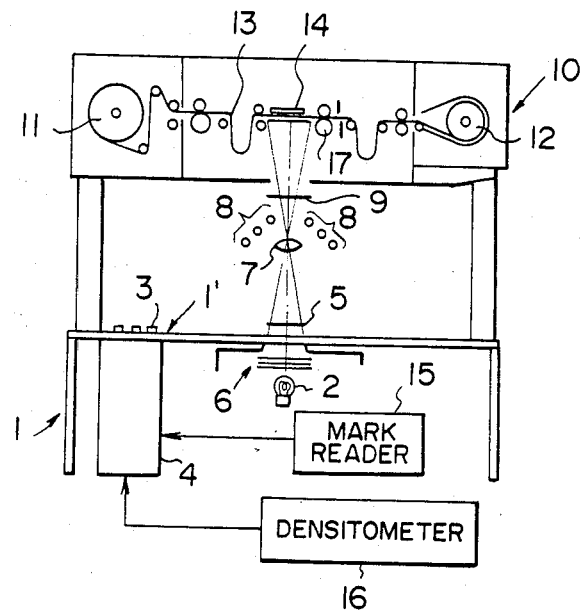
FIG. 1 is a schematic view showing an embodiment of the photographic printing apparatus in accordance with the present invention.

Referring to FIG. 1, a light source 2 is positioned below a control panel 1' on a desk 1, and light is emitted upwardly from the light source 2 for carrying out printing. Color formation control buttons 3 are positioned on the control panel 1', and a control section 4 for carrying out color control, density control, size compensation and the like are positioned just below the control buttons 3. The light source 2 comprises a halogen lamp or the like. The light emitted from the light source 2 passes through color compensation control filters 6 positioned above the light source 2. Then the light passes through a color negative 5 loaded in a negative frame on the desk 1, and enters an enlarging lens 7. In the vicinity of the enlarging lens 7 are positioned light receiving sections 8 for printing control, which detect information on the three primary colors in the image plane of the color negative 5. Above the enlarging lens is also positioned a shutter 9 for exposure control. A cabinet 10 housing a feed reel 11 and a wind-up reel 12 is positioned above the desk 1, and photographic paper 13 is loaded between the feed reel 11 and the wind-up reel 12. Actually, since the cabinet 10 is shielded from light by a front cover, there is no risk of the photographic paper 13 exposed to external light even when the apparatus is used in a daylight environment. In the cabinet 10 is also positioned an information printing device 14 for printing characters or marks representing the printing information in simultaneous printing on the back side of the photographic paper 13. In the make-over printing, the printing information printed on the back side of the print during simultaneous printing is read out by a mark reading machine 15 such as an OCR or an OMR connected with the control section 4. Then the printing information thus read out is converted into an electric signal and sent to the control section 4. To the control section 4 is also connected a densitometer 16. Further, a tape reader, a cassette reader or the like is connected to the control section 4 when necessary.

Figure 2:
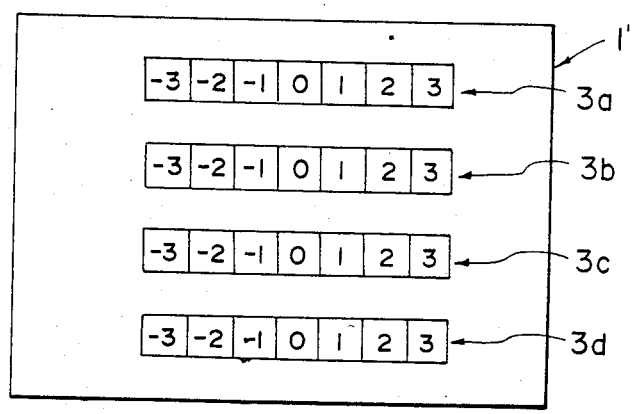
FIG. 2 is an enlarged plan view showing the control panel comprising a keyboard employed in the embodiment of FIG. 1.

FIG. 2 is an enlarged view showing the arrangement of the color formation control buttons positioned on the control panel 1' as shown in FIG. 1. The color formation control buttons 3 comprises density keys 3a, color keys (blue) 3b, color keys (green) 3c, and color keys (red) 3d.

The apparatus as shown in FIGS. 1 and 2 operates as described below. When simultaneous printing is carried out, light is emitted from the light source 2 and passed through the color negative 5. The light carrying the information on the three primary colors in the image plane of the color negative 5 is detected by the light receiving sections 8 for printing control. The detected light is then converted into an electric signal and sent to the control section 4. On the basis of the information on the three primary colors thus detected, the control section 4 calculates the density values of the three primary colors, and activates the color compensation filters 6 so as to correct deviations from the set values. When correction of each color is finished, the exposure control shutter 9 is activated, and exposure of the photographic paper 13 to light is conducted via the shutter 9. Thereafter, the photographic paper 13 is moved by drive rollers 17 by a predetermined length in the direction towards the wind-up reel 11.

At this time, the printing information such as the information on densities of the three primary colors or the information on the composite density of the three primary colors is printed by the mark printing device 14 on the back side of the photographic paper 13 after the aforesaid exposure.

When defective prints arise due to a color formation failure in continuous prints produced by the simultaneous printing and the corresponding color negatives have to be again printed correctly, the continuous defective prints and the corresponding color negatives are sorted by a sorting step and sent to a make-over printing step. Thereafter, the printing information printed in the defective prints is read out by the mark reading machine 15, converted into an electric signal, and sent to the control section 4.

On the other hand, the make-over printing operator observes the defective prints and judges the manner in which correction is made to obtain optimal prints. For example, when the density of a print as measured by the densitometer 16 is low and the cyan tone is too strong in the print, the make-over printing operator judges that the whole exposure time should be increased by 20% and the exposure time for cyan should be 10% shorter than the increased whole exposure time. On the basis of the judgement, the operator inputs the correction amounts for make-over printing from the color formation control buttons 3. At this time, the color formation control buttons 3 are set in a make-over printing mode by use of function switches (not shown). In the make-over printing mode, the color keys 3b, 3c and 3d are used respectively for correction of cyan, magenta and yellow.

In the above-described embodiment, the apparatus memorizes the exposure conditions corresponding to the exposure information on the first print, and the exposure amount for make-over printing is automatically adjusted when only the exposure correction amount of the make-over print with respect to the first print is entered from the color formation control buttons 3. Accordingly, the apparatus realizes make-over printing at a higher accuracy and at a higher speed than those of the conventional apparatus.

On the other hand, when the printing apparatus used for make-over printing is different from that used for producing the first print, the print density of a standard negative for condition setting is measured and memorized in the different printing apparatuses. Then, the exposure time is determined by the controller with reference to the difference in the printing setting conditions between the printing apparatuses (in some cases, the exposure time is determined also with reference to a difference between printer characteristics). The exposure information printed in the first print should preferably include a mark for identifying the printing apparatus used for producing the first print.

In the second embodiment just described above, the controller automatically adjusts the exposure conditions on the basis of the combination of the exposure conditions of the first print, the exposure correction amount of the second print with respect to the first print, and the previously set difference in the printing setting conditions between printing apparatuses, with one another. Accordingly, manpower for make-over printing is reduced, and the accuracy of the make-over printing function is improved.

I claim:

1. A photographic printing apparatus for photometrically detecting the density information on three primary colors consisting of red, green and blue in an original recorded in a negative film, and for determining exposure conditions of said negative film by combining said density information with printing setting conditions in said photographic printing apparatus and an exposure correction amount according to a picture pattern,
wherein the improvement comprises the provision of a means for discriminating exposure information located on a first print, means for memorizing exposure conditions of said first print corresponding to said exposure information, and keyboard means for inputting an exposure correction amount of a remake print with respect to said first print, whereby exposure conditions of said remake print are determined by combining said exposure conditions of said first print with said exposure correction amount of said remake print with respect to said first print.

2. An apparatus as defined in claim 1 wherein said means for discriminating exposure information on a first print comprises a means for optically reading out said exposure information on said first print and converting said exposure information into an electric signal.

3. An apparatus as defined in claim 1 or 2 wherein said control keyboard is provided with color formation control buttons comprising density keys and color keys for correction of cyan, magenta and yellow.

4. A photographic printing apparatus for photometrically detecting the density information on three primary colors consisting of red, green and blue in an original recorded in a negative film, and for determining exposure conditions of said negative film by combining said density information with printing setting conditions in said photographic printing apparatus and an exposure correction amount according to a picture pattern,
wherein the improvement comprises, when a remake print is produced by use of a second printing apparatus different from a first printing apparatus for producing a first print, providing a means for discriminating exposure information located on said first print, means for memorizing exposure conditions of said first print corresponding to said exposure information, keyboard means for inputting an exposure correction amount of said remake print with respect to said first print, means for inputting a difference in setting conditions between said first printing apparatus and said second printing apparatus, and means for memorizing said difference in setting conditions between said first printing apparatus and said second printing apparatus, whereby exposure conditions of said remake print are determined by combining said exposure conditions of said first print, said exposure correction amount of said remake print with respect to said first print, and said difference in said setting conditions with one another.

5. An apparatus as defined in claim 4 wherein said means for discriminating exposure information on a first print comprises a means for optically reading out said exposure information on said first print and converting said exposure information into an electric signal.

6. An apparatus as defined in claim 4 or 5 wherein said control keyboard is provided with color formation control buttons comprising density keys and color keys for correction of cyan, magenta and yellow.

7. An apparatus as defined in claim 4 or 5 wherein said exposure information on said first print comprises information for identifying said first printing apparatus used for producing said first print.

* * * * *